United States Patent Office 2,761,130
Patented Aug. 28, 1956

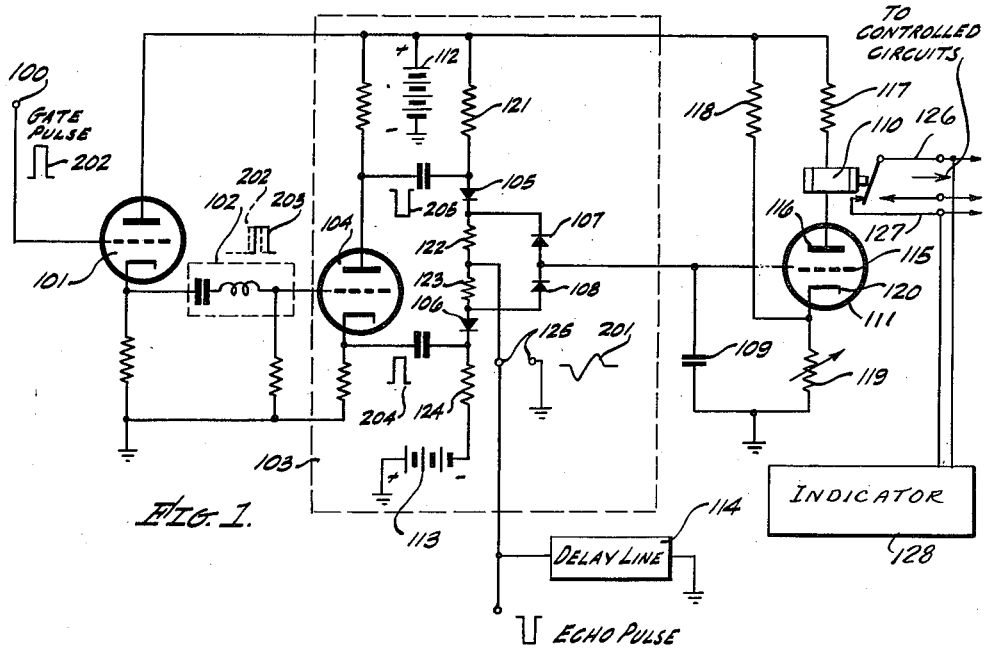
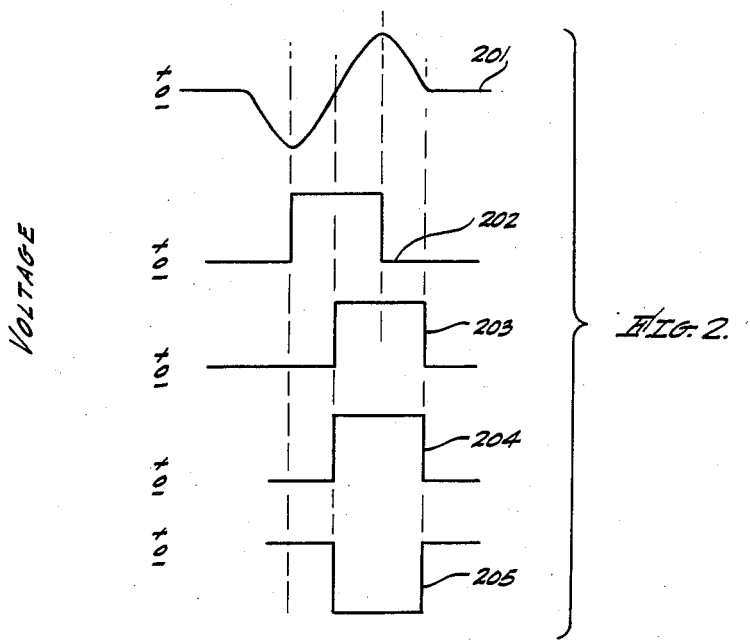

2,761,130

RADAR LOCK-ON RESPONSIVE CONTROL CIRCUIT

Paul J. Kibler, Los Angeles, Calif., assignor, by mesne assignments, to Hughes Aircraft Company, a corporation of Delaware Application August 4, 1953, Serial No. 372,268

6 Claims. (Cl. 343—7.3)

This invention relates to automatic target tracking radar systems and, in particular, to an improved circuit for indicating target acquisition and automatically initiating other radar functions upon acquisition of a target by the radar.

In automatic tracking radar systems installed in military aircraft, circuits are provided for indicating the range and direction of targets from the pursuing aircraft. They include automatic range tracking circuits which operate by maintaining coincidence between a range gate signal developed within the radar and a target echo signal received by the radar. During the radar's operation, the echo signal is generally received at the range tracking circuits as a negative-going pulse. The negative-going pulse is impressed on a delay line in the circuit to develop a composite video signal. The composite signal includes an initial negative-going pulse immediately followed by a positive-going pulse that is a mirror image of the initial pulse. In the automatic tracking phase of radar operation, the range gate signal brackets the center of the composite video signal to overlap contiguous portions of the positive and negative pulses. The automatic tracking circuits respond to any difference between the amount that the range gate overlaps the positive pulse and the amount that it overlaps the negative pulse, to advance or retard the range gate until it is substantially coincident with the center of the composite video signal. Thereafter, the range tracking circuits operate to maintain this coincidence, and, at the same time, provide a range signal and a range rate voltage.

Initially, in any mission engaged in by an aircraft equipped with automatic tracking radar, the radar system is employed in an automatic searching mode of operation. In some automatic-tracking-radar-equipped aircraft, a pilot both guides the aircraft and operates the radar. In other aircraft, a pilot and radar operator are required. When a target is observed on the radar indicator, the pilot, or operator, employs manual controls to arrest the automatic searching operation and to direct the radar antenna to fix its aim at a selected target.

In modern military aircraft, there are so many functions which demand an operator's attention that the inclusion of automatic control apparatus to relieve some of the complexity is a necessity. When a target has been observed, as described above, the operator may manually bring a range tracking gate into coincidence with the observed target indication on his radar scope. Were the operator also required to divert his attention to set automatic tracking equipment into operation, when the radar is locked on a target, this would place a needless burden on him since it is possible to provide automatic means to this end.

It is the purpose of this invention to provide automatic means for initiating the automatic tracking phase of operation when a target has been acquired. To accomplish the automatic operation, the previously mentioned coincidence of the range tracking gate and the composite video signal is used in this invention in a parallel circuit system which produces a delayed version of the range tracking gate, to coincide only with the positive portion of the composite video signal when the range gate is centered on this signal as previously described. The circuit provides positive pulses when there is coincidence. The positive pulses are employed to operate appropriate control circuits.

The system of this invention provides improved operation over the prior art where the target acquisition control circuits of automatic tracking radar systems compared signal energy received in the absence of targets with signal energy received in the presence of selected targets. A difference signal in these prior art circuits can be produced by noise signals because, in the no-target condition, the prior art circuits do not fall to a zero voltage in the absence of the target signal. The circuits are accordingly affected by noise and other spurious signals and produce difference voltages at times when they are not wanted.

This invention overcomes the disadvantages of the prior art. In the absence of targets, the circuit of this invention integrates the attendant noise and spurious signal voltages to zero; and, in the presence of a target signal, always provides a positive voltage. The circuit employs a relay-controlling-vacuum tube. The tube is normally biased to a suitably low plate current at which a relay in the plate circuit is inoperative. This is the condition of the circuit in the absence of a positive voltage applied to the grid of the tube. The vacuum tube is rendered conductive when the positive voltage developed in the presence of a target signal is applied, thereby energizing the relay which, in turn, operates the indicating and other devices. The indicating devices thus make known that a target has been acquired by the radar and is being tracked by the antenna. At the same time, for example, in a two-man radar, the pilot's indicator is turned on to give range, range rate, and steering information. The circuit of this invention operates as long as the radar antenna remains locked-on to a target and continues to track the target. When the target exceeds the tracking range or, by an evasive maneuver, avoids the radar beam, the loss of the target is also indicated by the deenergization of the indicating devices in the absence of the positive voltage described above.

Accordingly, it is an object of this invention to provide a circuit in a radar system which is insensitive to noise and spurious signal voltages and responds only to target echo signals to energize indicating circuits for advising the operator that the radar has acquired a target and is tracking it and for controlling other tracking radar functions.

It is a further object of this invention to provide a circuit, in cooperation with a coincidence gate circuit, which is responsive only to target echo signals for indicating target acquisition and tracking in a radar system.

A still further object of this invention is to provide a circuit for indicating target acquisition which integrates noise voltages and voltages developed from spurious signals to zero but always provides a positive voltage in the presence of a selected target echo signal.

The novel features which are believed to be characteristic of this invention, both as to its organization and method of operation, together with further objects and advantages thereof, will be better understood from the following description considered in connection with the accompanying drawings, and its scope is pointed out in the appended claims. In the drawings:

Fig. 1 is a schematic circuit diagram of a preferred embodiment of the radar lock-on responsive control circuit of this invention; and Fig. 2 is an illustration of the waveforms appearing at various parts of the circuit of Fig. 1.

To more clearly set forth the operation of the circuit of this invention, reference must be made to some of the operations of automatic target tracking radar systems. In one of these, a target echo signal is operated upon by a shorted delay line to produce a signal in which an inverted reflection of the applied negative target echo signal is added to the original signal to produce a composite video signal comprising the early negative portion and immediately following late positive portion.

In the waveforms of Fig. 2, this composite signal is illustrated at 201. A range gate signal is shown at 202. It can be seen that the gate signal 202 is coincident with the mid-point of the composite signal 201. The coincidence has been described earlier. A system, in which composite video and range gate signals like the signals 201 and 202 are developed in the above described manner, is disclosed in copending application for patent of Robert J. Shank, entitled "Range Voltage Generating Circuit for Automatic Range Tracking," Serial No. 341,314, filed March 9, 1953.

Referring now to Fig. 1, an isolation amplifier 101, connected as a cathode follower, is coupled to a source 100 of range gate pulses in an automatic tracking radar system. Range gate pulses are generated in the range voltage generating circuits of such a radar as part of the radar's automatic range tracking system. A delay network, shown in the dashed block 102, couples cathode follower 101 to a coincidence gate circuit shown in the dashed block 103. Delay network 102 has a predetermined time delay, as hereinafter described. Within coincidence gate circuit 103, a vacuum tube 104 is connected as a phase inverter, with its grid circuit coupled to delay network 102, to receive the delayed range gate pulses. The anode of phase inverter 104 is capacitively coupled to the anode of a gate diode 105. The cathode of phase inverter 104 is capacitively coupled to the cathode of a gate diode 106. The gate diodes are a part of a series circuit including a resistor 121, diode 105, resistors 122, 123, diode 106, and a resistor 124. The network is connected between a source of potential 112, positive with respect to ground, and a source of potential 113, negative with respect to ground. This network also includes a switch diode 107 and a switch diode 108 connected in series with respect to each other and across resistors 122 and 123. The cathode of switch diode 107 is connected to the junction of resistor 122 and the cathode of diode 105. The anode of diode 107 and the cathode of diode 108 are connected together. The anode of diode 108 is connected to the junction of resistor 123 and the anode of diode 106. The potential difference across diodes 105 and 106 is poled so that the two diodes are normally conducting. The flow of current in the series circuit is limited by the impedance of the diodes and the series resistors 121, 122, 123, and 124. The junction between resistors 122 and 123 is returned to ground through a grounded delay line 114, which is part of the range voltage generating system hereinbefore referred to.

The coincidence gate circuit 103, described above, is similar to one disclosed in the co-pending application for patent of Robert J. Shank, previously mentioned. The output current of the coincidence gate circuit 103, developed at the junction of diodes 107 and 108, is applied to one terminal of an integrating capacitor 109, and to the grid 115 of a relay control vacuum tube 111. The other terminal of capacitor 109 is connected to ground. A relay 110 is connected between the anode 116 of vacuum tube 111 and the source of positive potential 112 through a resistor 117. Relay 110 may have any combination of contact terminals as may be required for controlling the operation of electric circuits. There is shown single pole double throw contacts in the closed position they would assume upon energization of relay 110. The closed contacts 126 and 127 are connected to control an indicator 128 so that indicator 128 is energized when relay 110 is energized. A fixed resistor 118 is coupled between positive potential source 112 and the cathode 120 of vacuum tube 111. A variable resistor 119 is connected between the cathode 120 and ground. Resistors 118 and 119 form a voltage divider. At the junction of resistors 118 and 119 with the cathode 120 of vacuum tube 111, a positive potential is applied to the cathode as an adjustable fixed bias to maintain the tube at a low value of plate current when no voltage is applied from the coincidence gate circuit 103 to charge integrating capacitor 109.

The remaining waveforms of Fig. 2, to which reference is now made, represent the important signal voltages involved in the operation of this invention. The gate pulse 202 is applied to the circuit of this invention at the grid of cathode follower 101 and appears in identical form at the cathode of cathode follower 101. The pulse 202, from the cathode follower 101, is applied to delay network 102 which imposes a time delay on the pulse 202. The amount of delay is such as to make the delayed pulse 203 substantially coincident with the positive-going portion of the composite video signal when the range pulse is centered on the video signal as shown in Fig. 2. The delayed pulse 203 is applied to the coincidence gate circuit 103 at the grid of phase inverter 104. Waveforms 204 and 205 show the polarity and time relationship of the pulses developed in the output of phase inverter 104. Pulse 204 is developed at the cathode of phase inverter 104, and pulse 205 is developed at the anode of phase inverter 104. The pulses 204 and 205 are applied to gate diodes 106 and 105, respectively. Waveform 201, as previously noted, illustrates the composite video signal applied to the coincidence gate circuit at terminals 125. The composite video signal 201 is derived from the range voltage generating circuit as referred to above.

The operation of this invention, to energize an indicating and other circuits when a target is acquired by the radar, may be fully understood from the following description taken with reference to Figs. 1 and 2. Positive range gate pulse 202, generated in the radar system, is applied to the cathode follower 101. Cathode follower 101 provides a low-impedance source to drive delay network 102 and isolates the indicating circuit from other circuits of the radar system that may be coupled to the range gate pulse source 100. The delayed range gate pulse 203, applied to the phase inverter 104 in the coincidence gate circuit 103, results in a negative pulse 205, which is developed at the anode, and a positive pulse 204, which is developed at the cathode of the phase inverter 104. Negative range gate pulse 205 is applied to the anode of gate diode 105, and positive range gate pulse 204 is simultaneously applied to the cathode of gate diode 106.

As previously pointed out, the gate diodes 105 and 106 are normally conducting, thereby developing a positive potential with respect to ground at the junction between diodes 105 and 107 and developing a negative potential with respect to ground at the junction between diodes 106 and 108. Since the potential drop across diodes when they are conducting is quite low, it may be stated, for the purpose at hand, that the plate and cathode potentials of the conducting diodes 105 and 106 are approximately equal. Therefore, the cathode of switch diode 107 is at a positive potential with respect to ground and the anode of switch diode 108 is at a negative potential with respect to ground. However, the anode of diode 107 and cathode of diode 108, which are connected together, are maintained at substantially ground potential through the external circuit comprising vacuum tube 111 and capacitor 109. Hence, as long as gate diodes 105 and 106 are conducting, the cathode of switch diode 107 is positive with respect to its anode and the anode of switch diode 108 is negative with respect to its cathode. The switch diodes 107 and 108 are thereby rendered nonconducting as long as the gate diodes 105 and 106 are conducting.

When the delayed range gate pulses 204 and 205, respectively, are applied to diodes 106 and 105, respectively, the anode of gate diode 105 is thereby made negative with respect to its cathode and the cathode of gate diode 106 is thereby made positive with respect to its anode, whereby the diodes 105 and 106 are rendered nonconducting. Thus, during the application of delayed range gate pulse 203 to phase inverter 104, current ceases to flow through the diodes 105 and 106 so that the positive biasing potential at the junction between diodes 105 and 107 and the negative biasing potential at the junction between diodes 106 and 108 is removed, thereby bringing these junctions to the potential of the composite video pulse 201 applied at terminals 125 through the circuit connected thereto. Consequently, since the holdoff bias across them is no longer present, switch diodes 107 and 108 now become operative to conduct appropriately polarized signals applied to terminals 125 which coincide with range gate pulses 204 and 205.

Composite video signal 201 is developed in the radar from the echo signals received from the selected radar target which it is desired to track automatically. The radar incorporates means for adjusting the timing of the range gate pulse 202 to coincide with the center crossover of composite video signal 201, as shown in Fig. 2.

The composite video signal 201 is impressed on the circuit of this invention at terminals 125. This signal has an early negative portion and an immediately following positive portion. The duration of the early negative portion and of the late positive portion of signal 201 is the same. Delay line 102 imposes a time delay on range gate pulse 202 sufficient to make the resultant delayed pulse 203 coincident with only the late positive portion of signal 201, as can be seen in Fig. 2. Thus, when the positive portion of the signal 201 appears at terminals 125, coincident with range gate pulses 204 and 205, the positive pulse portion of 201 is conducted through diode 108 to charge capacitor 109.

In the event that other signals, such as noise, are received at terminals 125, then, during the occurrence of range gate pulses 204 and 205, diodes 108 and 107 will, respectively, conduct the positive and negative portions of these randomly occurring signals to charge and discharge capacitor 109, which integrates the charges to zero.

Accordingly, then, capacitor 109 becomes charged with a positive potential only when there is coincidence between the late positive portion of the selected target composite video signal 201 and the delayed range gate pulse 203.

When capacitor 109 is charged with a positive potential as described above, relay control vacuum tube 111 is rendered more highly conducting, energizing relay 110. The contacts of relay 110 are shown in the energized position. Circuits controlled by these contacts may be those of any indicating device that is desired. A lamp on the pilot's instrument panel as in indicator 128 might be one such indicator. Other relay contacts may at the same time initiate the operation of any other devices in the aircraft.

It can be seen that, according to this invention, when, in an automatic tracking radar, a selected target has been acquired, a lock-on indication is given only for that selected target. The automatic tracking functions are initiated only when the selected target has been acquired. The circuit of the invention discriminates against noise signals or other spurious signals and gives no indication for such signals.

What is claimed is:

1. A circuit for energizing a control means only when there is coincidence between a selected polarity of signal pulses applied to said circuit and predetermined gating pulses also applied to said circuit, said circuit comprising: delay network and phase inverter means for receiving said gating pulses and developing a simultaneous pair of delayed gating pulses of opposite polarity in response to said gating pulses; coincidence gate means coupled to said delay network and phase inverter means for receiving said simultaneous pair of delayed gating pulses and for receiving said signal pulses, said coincidence gate means including unidirectional switching means and an integrator and being adapted to electrically integrate said signal pulses during the occurrence of said simultaneous pair of delayed gating pulses and to produce an output signal in response to the integration of said signal pulse, said output signal being polarized in the same sense as the selected polarity of said signal pulses that occur during said simultaneous pair of delayed gating pulses; and relay control circuit means coupled to said coincidence gate means, said relay control circuit means being responsive to said output signal for energizing a control means.

2. In a pulse echo radar system wherein composite video signals are developed in response to unidirectional video signals received by the system, and also wherein range gate pulses are developed: a circuit for energizing control devices only when there is coincidence between positive portions of said composite video signals and said range gate pulses, said circuit comprising: a delay network and phase inverter for receiving and delaying said range gate pulses and generating delayed simultaneous pairs of range gate pulses of opposite polarity; a coincidence gate circuit coupled to said delay network and phase inverter for receiving said delayed simultaneous pairs of range gate pulses, said coincidence gate circuit being adapted to receive said composite video signals for developing a positive output pulse each time positive portions of said composite video signals and said delayed simultaneous pairs of range gate pulses coincide in time; an integrating means coupled to said coincidence gate circuit for integrating said positive output pulses to develop a positive voltage signal; and a relay control circuit coupled to said integrating means and responsive to said positive voltage signal for energizing a relay, said relay being connected to an external circuit for operating control devices.

3. In an automatic radar pulse echo tracking system that develops composite video signals in response to unidirectional video signals received by the system and also generates range gate pulses, a target acquisition circuit for energizing a utilization device when there is coincidence between a predetermined portion of said composite video signals and said range gate pulses, said circuit comprising: a delay and phase inverting circuit for receiving and delaying and phase inverting the range gate pulses; a coincidence gate circuit coupled to said delay and phase inverting circuit means, for receiving said delayed and phase inverted range gate pulses, said coincidence gate circuit being adapted to receive said composite video signals and for developing a positive output pulse each time positive portions of said composite video signals and said delayed and phase inverted range gate pulses coincide in time; an integrating circuit coupled to said coincidence circuit for integrating said positive output pulses to develop a positive voltage signal; a relay; and a control circuit responsive to said positive voltage signal for energizing said relay, said relay being connected to operate said utilization device.

4. A radar target acquisition indicating circuit comprising: a cathode follower amplifier coupled to a source of range gate pulses; a delay network coupled to said cathode follower; a coincidence gate circuit coupled to said delay network and to a source of composite video signals; a charging capacitor coupled by one of its terminals to the output side of said coincidence gate circuit, the other terminal of said capacitor being grounded; and a vacuum tube relay circuit connected on its input side to the junction of said coincidence gate circuit and said charging capacitor, said vacuum tube relay circuit including in its plate circuit a relay, said relay being connected to an indicating circuit.

5. A circuit for automatically controlling tracking circuits upon the acquisition of a selected target in an automatic tracking radar system, said system developing composite video signals in response to unidirectional video signals received in the system, and also generating range gate pulses; said circuit comprising: a cathode follower amplifier coupled to the source of range gate pulses for isolating said circuit from the range gate generating circuits of the radar system and for receiving said range gate pulses; a delay network coupled to said cathode follower amplifier for receiving said range gate pulses and imparting to them a predetermined time delay; a coincidence gate circuit coupled to said delay network and to said source of said composite video signals, said coincidence gate circuit developing in its output circuit a positive pulse each time a delayed range gate pulse and the positive portion of said composite video signal coincide; an integrating capacitor connected across the output circuit of said coincidence gate circuit for integrating said positive pulses with respect to time to acquire thereby a positive charge; and a relay control circuit coupled on its input side to the junction of said integrating capacitor and said coincidence gate circuit, said relay control circuit being biased to a low current in the absence of a positive voltage applied across its input circuit, and responsive to said positive charge on said integrating capacitor for energizing a control circuit when said positive charge overcomes said bias.

6. A circuit for selectively energizing a control means only when there is coincidence between positive portions of composite radar signal pulses and predetermined gating pulses applied to said circuit, said circuit comprising: receiving means for receiving said predetermined gating pulses and developing delayed simultaneous pairs of gating pulses of opposite polarity; a coincidence gate for receiving said delayed simultaneous pairs of gate pulses and said composite radar signal pulses, said coincidence gate being coupled to said receiving means for developing an output signal whenever said delayed simultaneous pairs of gate pulses are applied to said coincidence gate and the positive portions of said composite radar signal pulses are present; integrating means coupled to said coincidence gate, for integrating said output signal and developing a voltage signal in response thereto; control means coupled to said integrating means for being energized only in response to said voltage signal when said voltage signal is of positive polarity; and utilization means coupled to said control means, said utilization means being energized when said control means is energized in response to said positive voltage signal.

References Cited in the file of this patent

UNITED STATES PATENTS

| | | |
|---|---|---|
| 2,421,018 | De Rosa | May 27, 1947 |
| 2,492,120 | Smith | Dec. 20, 1949 |
| 2,527,769 | Sinsheimer | Oct. 31, 1950 |
| 2,543,072 | Stearns | Feb. 27, 1951 |
| 2,560,289 | Hasbrook | July 10, 1951 |
| 2,578,256 | MacNichol | Dec. 11, 1951 |
| 2,628,349 | Nightenhelser | Feb. 10, 1953 |